United States Patent [19]

Suzuki

[11] Patent Number: 5,073,859

[45] Date of Patent: Dec. 17, 1991

[54] RATIO CONTROL FOR CONTINUOUSLY VARIABLE TRANSMISSION

[75] Inventor: Yutaka Suzuki, Atsugi, Japan

[73] Assignee: Nissan Motor Co., Ltd., Yokohama, Japan

[21] Appl. No.: 592,933

[22] Filed: Oct. 4, 1990

[30] Foreign Application Priority Data

Oct. 4, 1989 [JP] Japan ............................ 1-259376

[51] Int. Cl.$^5$ .............................................. G06F 15/20
[52] U.S. Cl. ................................................. 364/424.1
[58] Field of Search ......................... 364/424.1; 74/866

[56] References Cited

U.S. PATENT DOCUMENTS

| | | | |
|---|---|---|---|
| 4,509,125 | 4/1985 | Fattic et al. | 364/424.1 |
| 4,637,280 | 1/1987 | Oshiage | 364/424.1 |
| 4,649,486 | 3/1987 | Oshiage | 364/424.1 |
| 4,735,113 | 4/1988 | Yamamuro et al. | 74/866 |
| 4,956,776 | 9/1990 | Carre | 364/424.1 |
| 4,956,972 | 9/1990 | Sasajima et al. | 364/424.1 |

Primary Examiner—Salvatore Cangialosi
Attorney, Agent, or Firm—Foley & Lardner

[57] ABSTRACT

According to a ratio control system for a continuously variable transmission, when a ratio deviation is greater than or equal to a predetermined value, a feedback control on the ratio deviation is effected, while, when the ratio deviation is less than the predetermined value, a feedback control on an input revolution speed deviation is effected.

10 Claims, 5 Drawing Sheets

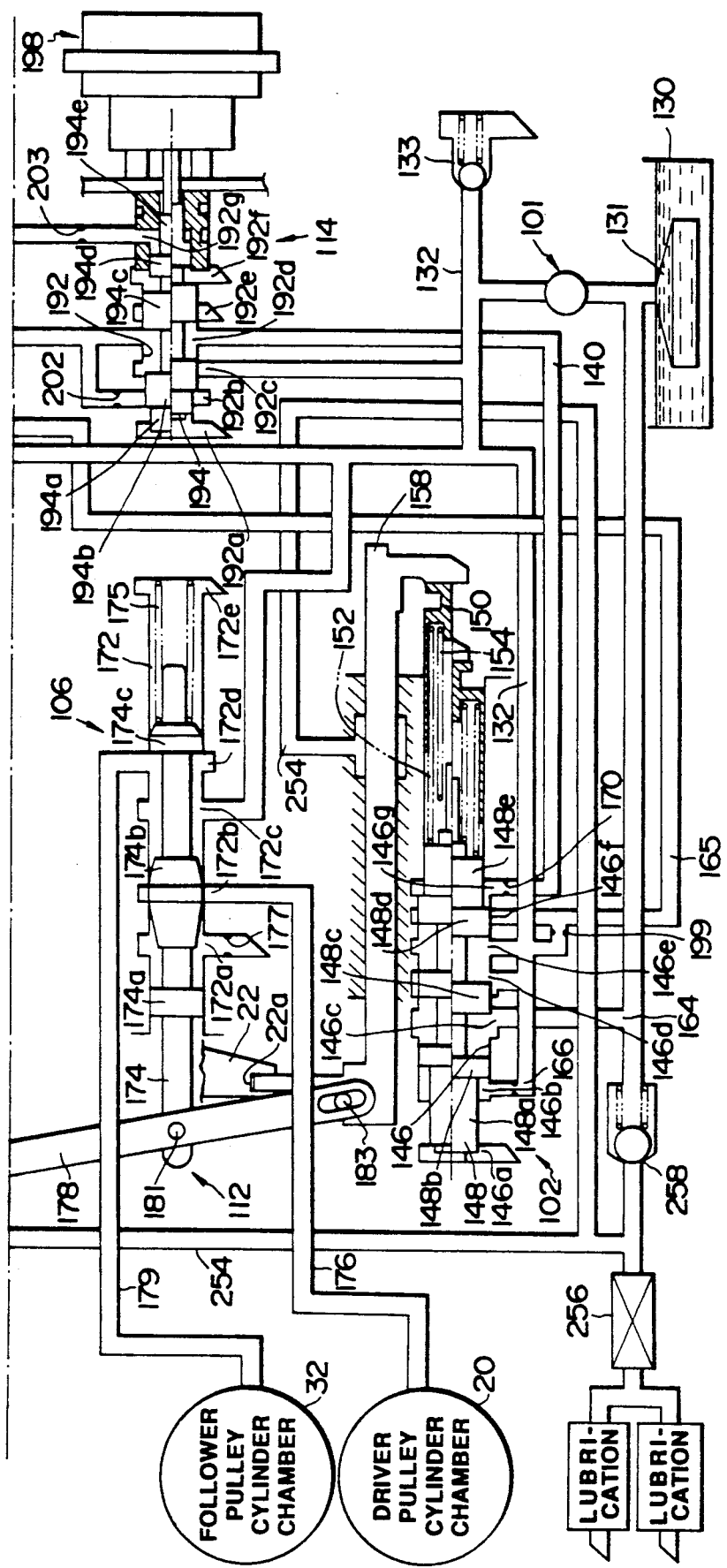

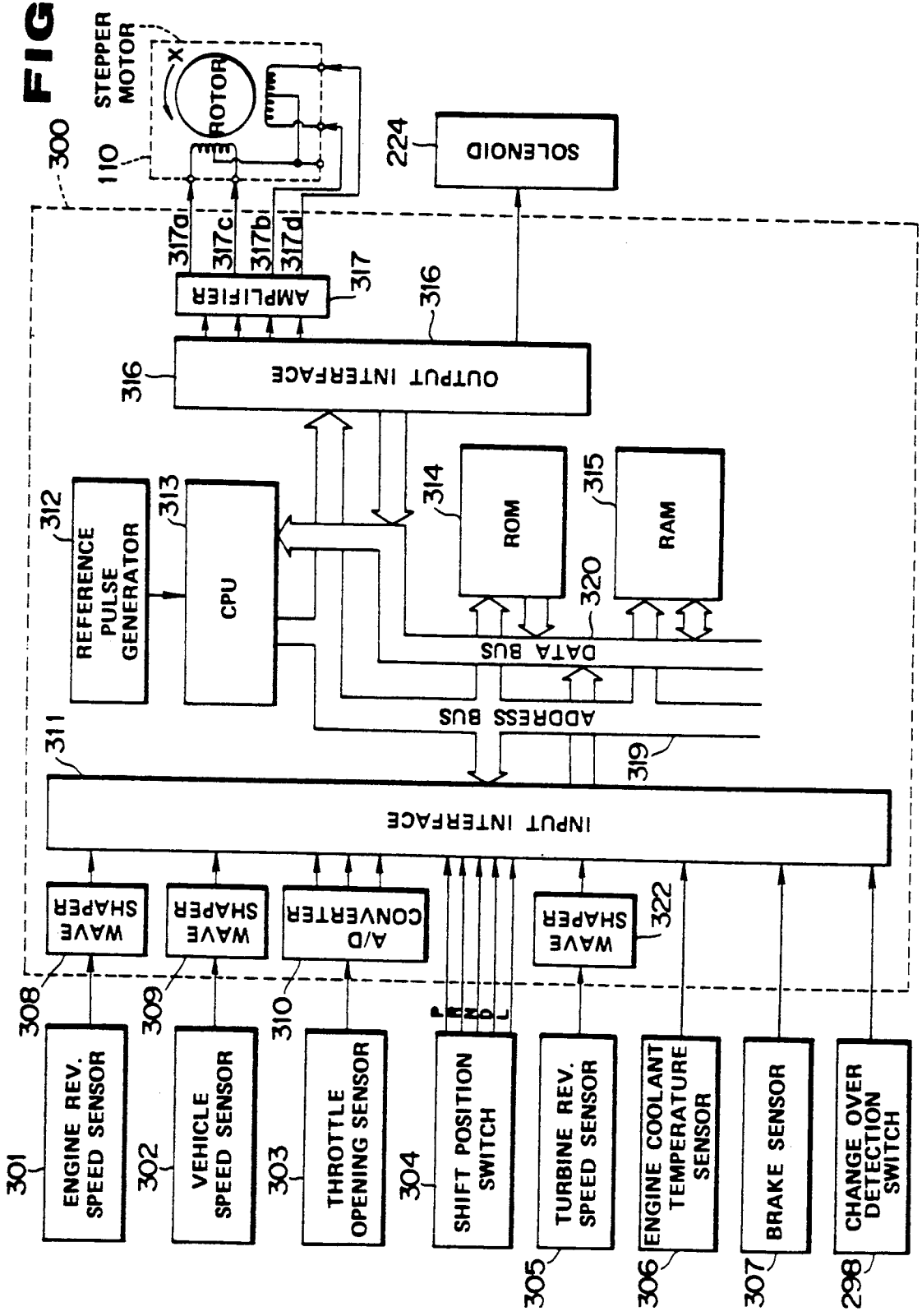

RATIO CONTROL FOR CONTINUOUSLY VARIABLE TRANSMISSION

RELATED APPLICATION

U.S. patent appln. Ser. No. 07/592,931 claiming priority on Japanese Patent Appln. No. 1-259374.

BACKGROUND OF THE INVENTION

The present invention relates to a ratio control system for a continuously variable transmission in a motor vehicle. U.S. Pat. No. 4,735,113 discloses a continuously variable transmission for a vehicle. According to a known ratio control system for the continuously variable transmission, a feedback control is effected whereby a reduction ratio in the continuously variable transmission is controlled in such a direction as to decrease an input revolution speed error or deviation toward error or deviation toward zero. That is, a target input revolution speed is determined by a table look-up operation of a shift point mapping based on vehicle speed and throttle opening degree. An error or deviation between the target input revolution speed and an actual input revolution speed is determined, and this deviation is used as a variable in a feedback control equation including a proportional term and an integral term. A result from calculating this equation is added to a target reduction ratio. An output signal indicative of this sum is supplied to a shift motor in the form of a stepper motor. This known feedback control poses a problem that, when the continuously variable transmission starts shifting up, the stepper motor does not turn by an angle large enough to compensate for a delay inherent with a hydraulic shift control circuit, causing a dull shift response. This derives from the fact that the feedback control is effected on the input revolution speed deviation only. In detail, at the beginning of shift where the vehicle speed and input revolution speed are low, the input revolution speed deviation is small. Under this condition, the feedback control value resulting from calculating the feedback control equation involving the input revolution speed deviation is small, As a result, an angle of rotation of the stepper motor induced is small, the displacement of a spool of a shift control valve is small, and a speed at which hydraulic fluid is supplied to a driver pulley is gradual. This provides a poor shift response and drivability.

SUMMARY OF THE INVENTION

An object of the present invention is to provide a ratio control for a continuously variable transmission which provides a good shift response and driveability.

According to the present invention, there is provided a ratio control system for a continuously variable transmission which is shiftable from an actual reduction ratio to a target reduction ratio, wherein, when a deviation between a target value and an actual value is greater than or equal to a predetermined value, a feedback control on a deviation between the actual reduction ratio and the target reduction ratio is effected, while, when said deviation is less than said predetermined value, a feedback control on a deviation between a target input revolution speed and an actual input revolution speed is effected.

Specifically, according to a ratio control system embodying the present invention, when a ratio deviation is greater than or equal to a predetermined value, a feedback control on the ratio deviation is effected, while, when the ratio deviation is less than the predetermined value, a feedback control on an input revolution speed deviation is effected.

According to another aspect of the present invention, there is provided a method of controlling a ratio change in a continuously variable transmission, the method comprising the steps of:
repeatedly determining a first deviation betwee a target value and an actual value;
comparing said first deviation with a predetermined value;
repeatedly determining a second deviation between an actual input revolution speed and a target input revolution speed;
effecting a first feedback control on said first deviation when said first deviation is greater than or equal to said predetermined value;
effecting a second feedback control on said second deviation when said first deviation is less than said predetermined value;
generating an output signal in response to said first feedback control or second feedback control; and
controlling a ratio change in the continuously variable transmission in response to said output signal.

BRIEF DESCRIPTION OF THE DRAWINGS

FIGS. 3A and 3B, when combined, are a hydraulic circuit diagram showing a control system for the continuously variable transmission; and FIG. 4 is a block diagram showing a control unit for executing the flowchart shown in FIG. 1.

DETAILED DESCRIPTION OF THE INVENTION

Referring to the accompanying drawings, and particularly to FIGS. 2, 3A, 3B, and 4, reference is made to a description in connection with FIGS. 2, 1A, 1B, and 3 of U.S. Pat. No. 4,735,113 which is hereby incorporated by reference.

Figure 1:
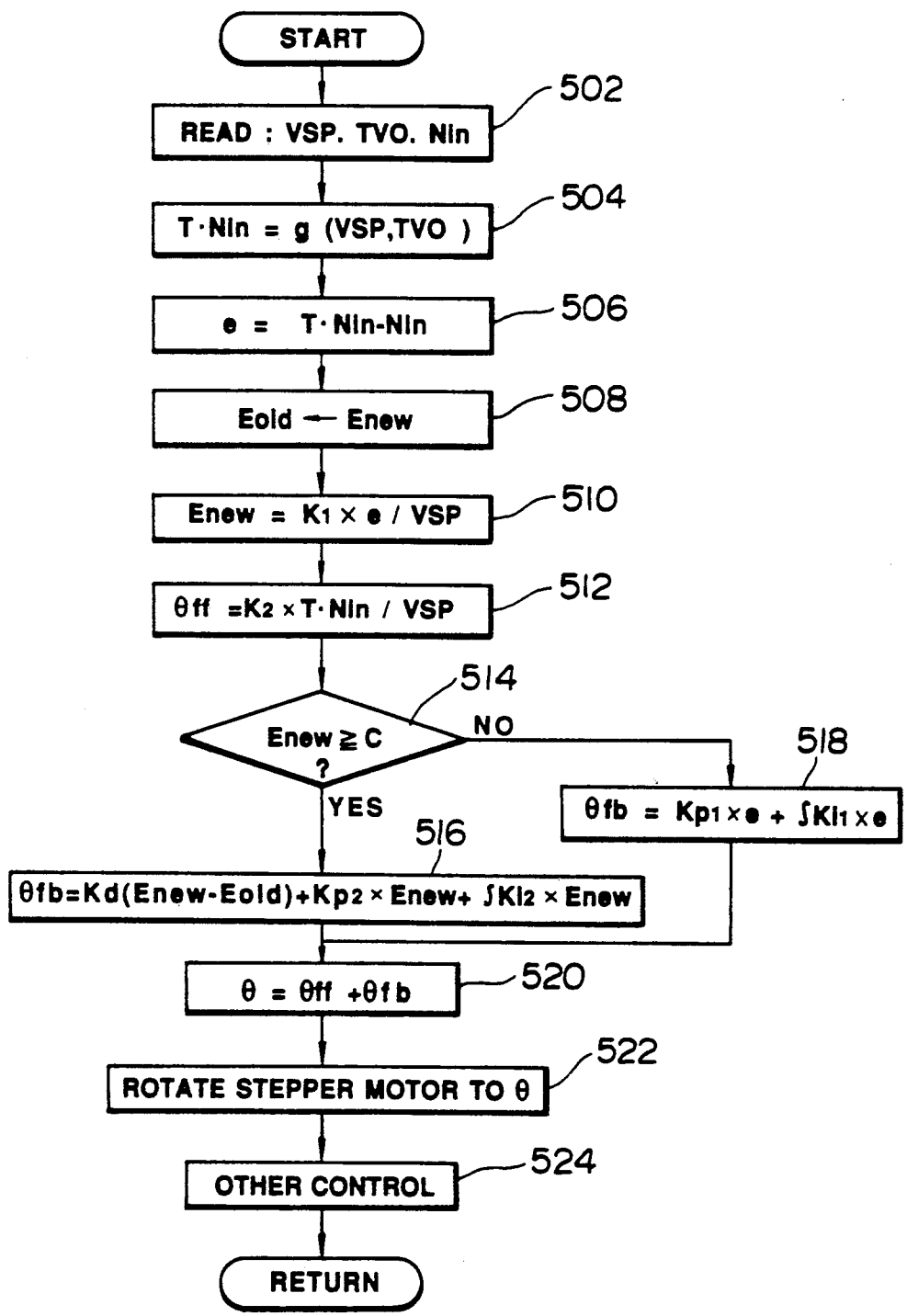
FIG. 1 is a flowchart illustrating the general operation of the present invention.
Figure 2:
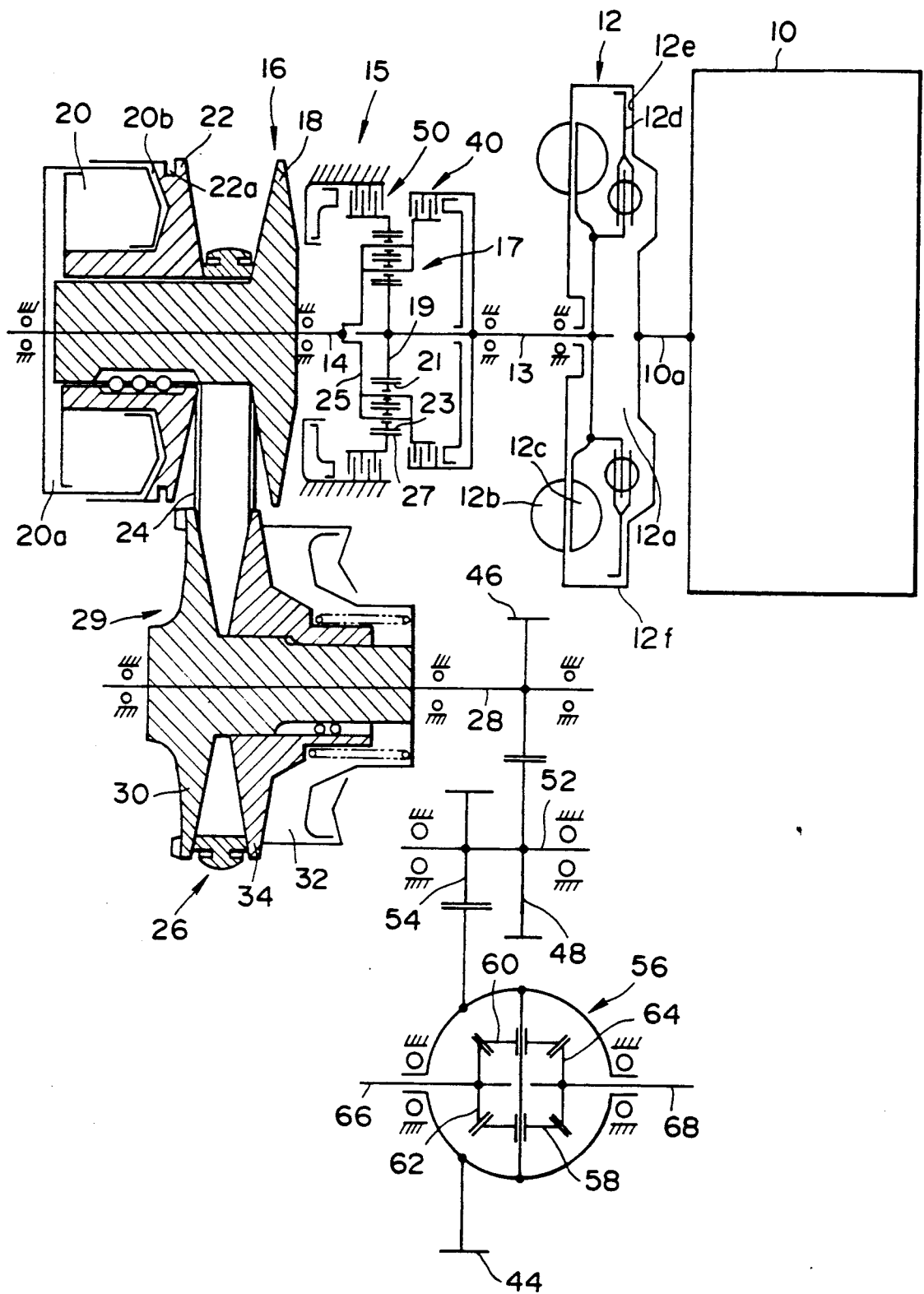
FIG. 2 is a schematic illustration of a continuously variable transmission drivingly connected to an engine of a motor vehicle.
Figure 3A:
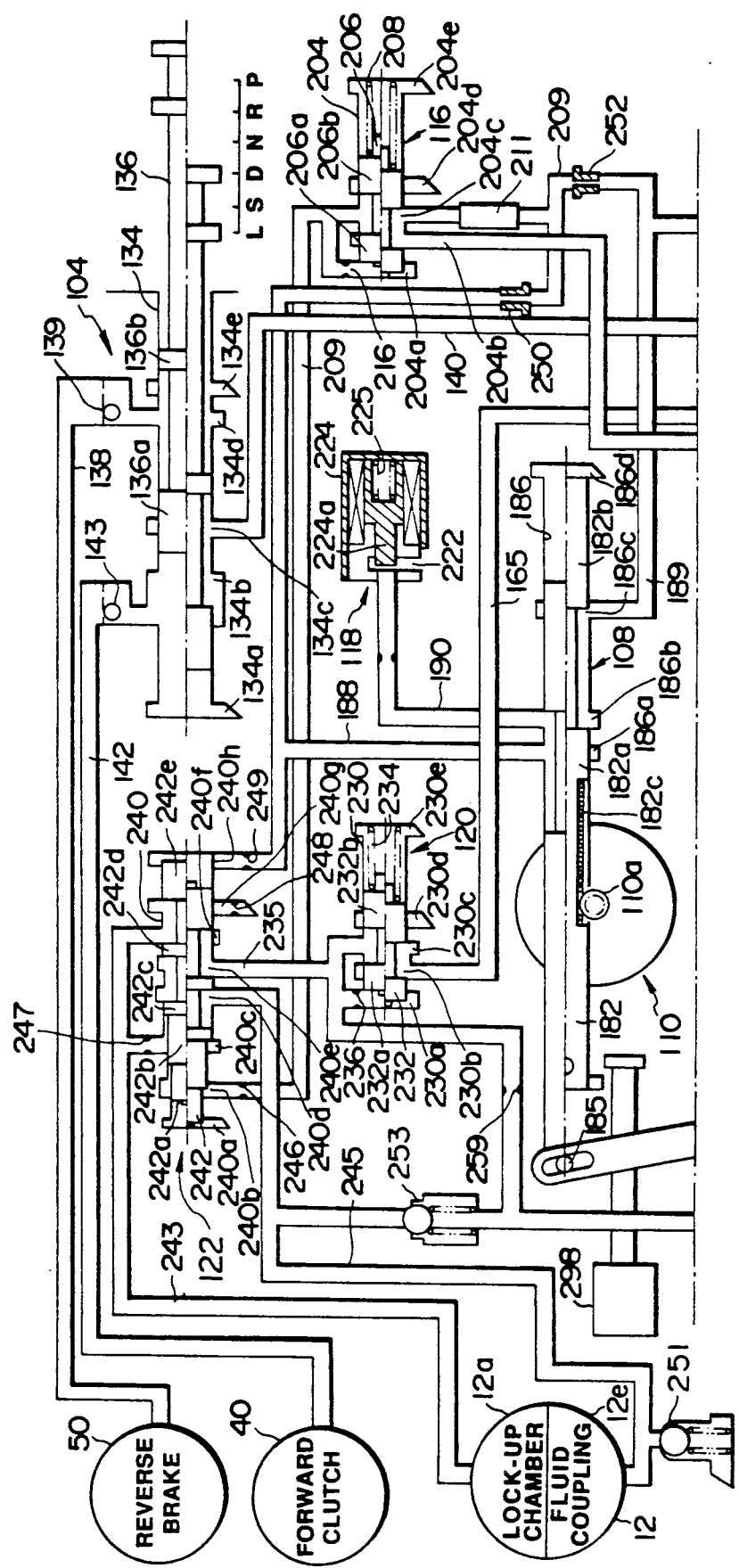

Referring to the flowchart shown in FIG. 1, at a step 502, a reading operation is performed to store output signals of vehicle speed sensor 302, a throttle opening sensor 303, and a turbine revolution speed sensor 305 as a vehicle speed VSP, a throttle valve opening TVO and an input revolution speed Nin, respectively. At a subsequent step 504, a target input revolution speed T-Nin is determined after performing a table look up operation of a predetermined shift point mapping based on vehicle speed VSP and throttle opening degree TVO. At the next step 506, an input revolution speed error or devation e is determined by calcyulating an equation that e = T-Nin − Nin. At a step 508, the present ratio error or deviation Enew is copied to an old ratio deviation Eold. Then, at a step 510, the present ratio deviation Enew is updated by calculating an equation that Enew = K1 × e/VSP, where K1 is constant. At a step 512, a feedforward control value θff is given by calculating an equation that θff = K2 × T Nin/VSP. At a decision step 514, it is determined whether the present ratio deviation Enew is greater than or equal to a predetermined value C or not. If the inquiry at the step 514 results in an affirmative answer, the program proceeds to a step 516 where a feedback control value θfb is given by calculating a first feedback control equation that $\theta fb = Kd (Enew - Eold) + Kp2 \times Enew + SKi2 \times Enew$.

If the inquiry at the step 514 results in a negative answer, the program proceeds to a step 518 where the feedback control value $\theta fb$ is given by a second feedback control equation that $\theta fb = Kp1 \times e + SKi1 \times e$. In the first and second feedback control equations, Kd, Kp1, Kp2, Ki1, and Ki2 are constant feedback gains, respectively. Then, the program proceeds from the step 516 or 518 to a step 520 where a target motor position $\theta$ is given as a sum of $\theta ff$ and $\theta fb$. An output signal is outputted to a stepper motor 110 to turn the stepper motor to the target motor position $\theta$. The program then proceeds to process other control at a step 524.

It will now be understood that, when the ratio deviation Enew is greater than or equal to the predetermined value C (step 514), the feedback control value $\theta fb$ is given by calculating the first feedback control equation involving the ratio deviation Enew as a variable (step 516), while when the ratio deviation Enew is less than the predetermined value C, the feedback control value $\theta fb$ is given by calculating the second feedback control equation involving the input revolution speed deviation e as a variable (step 518). Since the reduction ratio is given by dividing the input revolution speed by the vehicle speed, with the same input revolution speed, the reduction ratio becomes large when the vehicle speed is low. Therefore, when the ratio deviation E is large, the feedback control value $\theta fb$ based on this deviation E becomes large, providing a good shift response. When the ratio deviation E is small at high vehicle speeds, the feedback control value $\theta fb$ based on the input revolution speed deviation e is used, thus providing a stable control.

What is claimed is:

1. A ratio control system for a continuously variable transmission in a motor vehicle including an engine, the continuously variable transmission being drivingly connected to the engine and being shiftable in reduction ratio, the continuously variable transmission including an input member, the control system comprising:
    means for detecting a revolution speed of the input member and for generating an actual revolution speed indicative signal indicative of said detected revolution speed;
    means for detecting a vehicle speed of said vehicle and for generating a vehicle speed indicative signal indicative of said vehicle detected speed;
    a control unit receiving said input revolution speed indicative signal and said vehicle speed indicative signal and generating an output signal; and
    means for physically shifting the continuously variable transmission by changing a reduction ratio in the continuously variable transmission in response to said output signal,
    said control unit including
    means for determining a target reduction ratio of said transmission and for generating a target reduction ratio indicative signal;
    means for determining an actual reduction ratio of said transmission and for generating an actual reduction ratio indicative signal indicative of said actual reduction ratio;
    means for determining a ratio deviation between said actual reduction ratio indicative signal and said target reduction ratio indicative signal;
    means for determining a target input revolution of said input member and for generating a target input revolution speed indicative signal indicative of said determined target input revolution;
    means for determining an input revolution speed deviation between said actual input revolution speed indicative signal and said target input revolution speed indicative signal;
    means for comparing said ratio deviation with a predetermined value; and
    means for effecting a first feedback control on said ratio deviation when said ratio deviation is greater than or equal to said predetermined value, and for effecting a second feedback control on said input revolution speed deviation when said ratio deviation is less than said predetermined value.

2. A ratio control system as claimed in claim 1, wherein said first feedback control is a proportional, derivative and integral control including a first time derivative of said ratio deviation as a derivative term, and a time integral of said ratio deviation as an integral term.

3. A ratio control system as claimed in claim 2, wherein said second feedback control is a proportional and integral control including a time integral of said input revolution speed deviation as an integral term.

4. A method of controlling a ratio change in a continuously variable transmission, the method comprising the steps of:
    repeatedly determining a first deviation between a target value and an actual value of an operating parameter said transmission;
    comparing said first deviation with a predetermined value;
    repeatedly determining a second deviation between an actual input revolution speed and a target input revolution speed of said transmission;
    effecting a first feedback control on said first deviation when said first deviation is greater than or equal to said predetermined value;
    effecting a second feedback control on said second deviation when said first deviation is less than said predetermined value;
    generating an output signal in response to the effected one of said first feedback control and second feedback control; and
    physically shifting the continuously variable transmission by changing a ratio in the continuously variable transmission in response to said output signal.

5. A method as claimed in claim 4, wherein said first feedback control is a proportional, integral and derivative control including a time integral of said first deviation as an integral term, and a first time derivative of said deviation as a deviative term.

6. A method as claimed in claim 5, wherein said second feedback control is a proportional and integral control including a time integral of said second deviation as an intgral term.

7. The method of claim 4, further comprising the step of detecting an actual vehicle speed, wherein said step of repeatedly determining a first deviation comprises the step of determining a deviation between a target value and an actual value of a reduction ratio of said transmission by determining a difference between a target input revolution speed of said transmission and an actual input revolution speed of said transmission and by dividing said difference by said actual vehicle speed.

8. An apparatus comprising:

(a) a continuously variable transmission for a vehicle, said transmission being shiftable from an actual reduction ratio to a target reduction ratio; and (b) a ratio control system for said transmission, said ratio control system comprising
  (i) means for determining a deviation between a target value and an actual value of an operating parameter of said transmission,
  (ii) means for determining a deviation between a target input revolution speed and an actual input revolution speed,
  (iii) means for comparing said deviation between said target and actual values to a predetermined value,
  (iv) means for effecting a first feedback control operation on a difference between a target reduction ratio of said transmission and an actual reduction ratio of said transmission when said means for comparing determines that the deviation between said target and actual values is greater than or equal to said predetermined value and for effecting a second feedback control operation on said deviation between said target and actual input revolution speeds when said means for comparing determines that the deviation between said target and actual values is less than said predetermined value,
  (iv) means for generating an output signal in response to the effected one of said first and second feedback controls, and
  (v) means for physically shifting said transmission by changing a ratio in said transmission in response to said output signal.

9. The apparatus as recited in claim 8, wherein said operating parameter is a reduction ratio of said transmission.

10. The apparatus as recited in claim 9, further comprising means for calculating an actual vehicle speed and wherein said deviation between said target and actual values is determined by determining a difference between a target input revolution speed of said transmission and an actual input revolution speed of said transmission and by dividing said difference by said actual vehicle speed.

* * * * *